May 17, 1960 D. C. ENGELBART 2,937,317

GLOW DISCHARGE DEVICES

Filed May 29, 1956 14 Sheets-Sheet 1

INVENTOR.
Douglas C. Engelbart.
BY
Robert W. Hampton
ATTORNEY

May 17, 1960 D. C. ENGELBART 2,937,317

GLOW DISCHARGE DEVICES

Filed May 29, 1956 14 Sheets-Sheet 2

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 3

INVENTOR.
Douglas C. Engelbart

BY

Robert W. Hampton
ATTORNEY

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 5

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 6

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 7

INVENTOR:
Douglas C. Engelbart.
BY
Robert W. Hampton
ATTORNEY

May 17, 1960

D. C. ENGELBART 2,937,317

GLOW DISCHARGE DEVICES

Filed May 29, 1956

14 Sheets-Sheet 8

INVENTOR.
Douglas C. Engelbart

BY

Robert W. Hampton
ATTORNEY

May 17, 1960 D. C. ENGELBART 2,937,317

GLOW DISCHARGE DEVICES

Filed May 29, 1956 14 Sheets-Sheet 9

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 10

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 11

INVENTOR.
Douglas C. Engelbart.
BY
Robert W. Hampton
ATTORNEY

May 17, 1960 D. C. ENGELBART 2,937,317

GLOW DISCHARGE DEVICES

Filed May 29, 1956 14 Sheets-Sheet 12

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 13

INVENTOR.
Douglas C. Engelbart
BY
Robert W. Hampton
ATTORNEY

May 17, 1960 D. C. ENGELBART 2,937,317

GLOW DISCHARGE DEVICES

Filed May 29, 1956 14 Sheets-Sheet 14

INVENTOR.
Douglas C. Engelbart

BY

Robert W. Hampton
ATTORNEY

United States Patent Office 2,937,317

Patented May 17, 1960

2,937,317

GLOW DISCHARGE DEVICES

Douglas C. Engelbart, Berkeley, Calif., assignor, by mesne assignments, to Digital Techniques, Inc., Berkeley, Calif., a corporation of California

Application May 29, 1956, Serial No. 588,022

48 Claims. (Cl. 315—84.6)

This invention relates to gaseous discharge devices. In particular this invention is directed toward increasing the speed of operation of gaseous discharge shifting and stepping devices.

Gaseous discharge devices have enjoyed but limited use in computer circuits mainly because of their inferior operational speed as compared to vacuum tube circuits. For example, vacuum tube counters may operate at a rate of up to 10 million counts per second; whereas, gas tube counters have been limited to a reliable operating speed of under 100,000 counts per second. However, where the ultimate in speed is not required, gas tube devices, particularly the cold cathode type, offer advantages of low power consumption, simplified circuitry, and lower overall cost.

One of the important limitations on the operational speed of gaseous discharge counter or registers is the deionization or glow decay time. It has been discovered that when electric fields at certain frequencies are applied to a volume of ionized gas, deionization is hastened and thus operational speed is increased. The present invention is directed to the application of these electric fiields and is described, by way of example, in connection with a glow discharge shifting register of the type disclosed in my copending application Serial No. 521,555, filed July 12, 1955, now U.S. Patent No. 2,923,853, issued February 2, 1960. Briefly such a shifting register comprises a gas-filled tube and three arrays of electrodes associated with the tube defining a plurality of glow discharge positions which may sustain a glow at one time. High frequency potentials sequentially applied to the electrodes cause a stepping or shifting of a pattern of glow discharges in the tube. In other words, each glow discharge is shifted from one discrete glow discharge position to a successive glow discharge position during each cycle of operation of the device. The interval of one operation cycle thus corresponds to a digit interval. In such a shifting register, a binary "1" may be represented by the presence of a glow discharge and a binary "0" by the absence of a glow discharge or vice versa. Thus, a pattern of glow discharges represents a binary word.

Glow shifting is effected and controlled by applying the principle of "priming" which requires that the operating voltages applied to the tube be in the sustaining voltage range, that is, between "breakdown" voltage and "extinction" voltage. The breakdown voltage may be defined as that voltage which must be applied across a gas in a given case to initiate a glow discharge. The glow discharge can be sustained by a voltage somewhat below the breakdown voltage but if the voltage is lowered sufficiently, the glow dies out at a voltage called the extinction voltage. Thus when a first eelctrode is connected to a sustaining voltage, an initiated glow discharge is maintained. An adjacent, second electrode can be positioned such that the gaseous atmosphere in the region of influence of the second electrode is partially ionized due to its proximity to the glow discharge held by the first electrode. If a sustaining voltage is applied to such a "primed" electrode, it picks up a glow; whereas an unprimed electrode energized with the same potential remains inactive and does not pick up a glow. For proper operation of a glow discharge shifting or stepping tube, the operating voltages applied to the electrode arrays must be within the sustaining voltage range. If the operating voltages drop below the extinction voltage, the glow discharges will, of course, die out and be lost; if the operating voltages rise above the breakdown voltage, spurious glow discharges will occur at unprimed electrodes.

As previously mentioned, a primary limitation on the operational speed of gaseous discharge counters and registers is the deionization or "glow decay" time. Glow decay time may be defined as the time required, subsequent to the removal of a sustaining voltage from an electrode holding a glow discharge, for the ionization level to decrease to the extent that re-application of the sustaining voltage to the electrode will not revive the glow discharge. In other words, it is the time required for the ionization of the gaseous atmosphere associated with the electrode to drop below the priming level.

Glow decay time is influenced by such factors as gas composition and pressure, and particularly by vessel dimensions. The process of deionization is not completely understood, but it is thought that for the low-pressure gaseous discharge, deionization is mainly a process of diffusion of the electrons and ions to the vessel walls (and to the electrode surfaces in the case of internal electrodes). For example, experiments with external electrode glow shifting tubes, energized with high frequency, show that the glow decay time is less with tubes of small diameter than with tubes of large diameter.

It has been found that the diffusion process can be accelerated, thereby decreasing the glow decay time and increasing the operational speed, by subjecting the deionizing gas to appropriate electric fields. These fields apparently help to disperse the ionized particles, or "plasma," by sweeping the charges to the vessel walls. The electric fields may be applied to the gas by external electrodes and may be developed by an alternating potential at an appropriate frequency or by a D.C. potential change at the appropriate time in an operating cycle. A voltage thus applied to shorten the glow decay time is referred to hereinafter as a "quench" voltage.

The optimum magnitude and optimum frequency of a quench voltage cannot be generally specified at this stage of development, but these parameters are dependent on the dimensions involved and, in particular, upon the capacity between the electrodes and the inside walls of the vessel. The magnitude of the quench potential must be low enough not to cause appreciable ionization, and the frequency must be low enough to induce displacement oscillations of sufficient magnitude to sweep out or diffuse the ionized particles. Practical quench potentials and also practical energizing potentials may be determined, in a particular case, by routine experiment in view of the examples hereinafter presented.

It is, therefore, a general object of the present invention to rapidly deionize an excited region of a gaseous atmosphere.

Another object is to increase the speed of operation of a gaseous discharge stepping device.

A further object is to rapidly shift a glow discharge in a gas-filled channel.

Another object is to enter a selected pattern of glow discharges into a gas-filled channel.

Another object is to provide an improved glow shifting tube.

Another object is to provide a glow discharge shifting register which can be reliably shifted at speeds in excess of 100,000 cycles per second.

Another object is to simultaneously register a binary word and the complement of the word.

A further object is to provide a multi-position gaseous discharge shift register comprising a single unit of small size, low cost and of relatively high speed.

The underlying principle of the present invention is the application of a quench voltage to a decaying gaseous discharge to hasten diffusion of the plasma and thereby shorten the glow decay time.

Other objects and principles will appear from the following description, reference being made to the accompanying drawings wherein.

Figure 1:
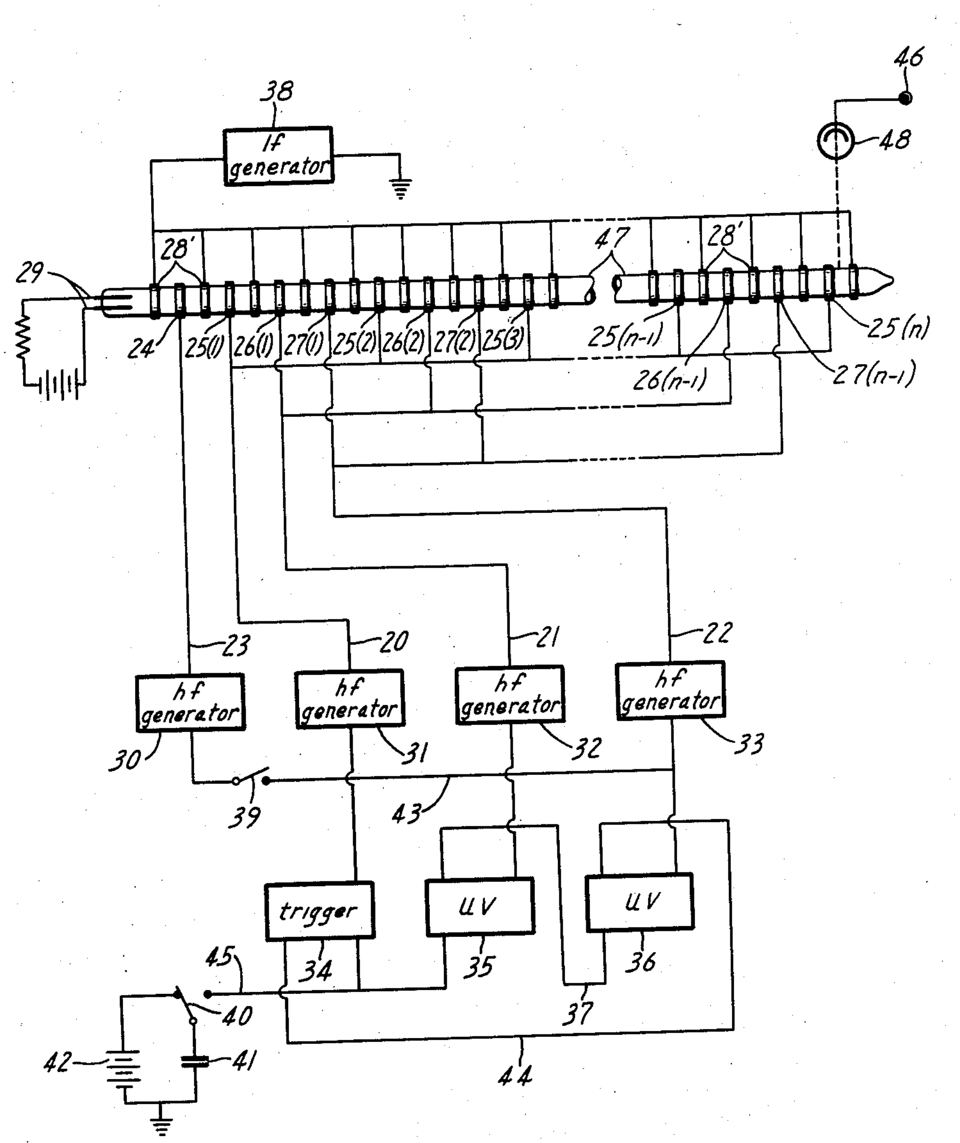
Fig. 1 is an illustration of an axial-field glow shifting tube with a block diagram of associated circuits including a quench potential generator.

A gas tube shifting register utilizing high frequency energized external electrodes to maintain and shift any reasonable number of glow discharges is shown in Fig. 1. A glow discharge channel formed, for example, of transparent material such as glass, is filled to a low pressure with an ionizable gas such as neon. External electrodes are formed as rings on bands around the tube. Alternate bands 28' are connected together and to a low frequency quench voltage source shown as LF generator 38. Since bands 28' are at ground or at a reference potential, they may be collectively referred to as a "reference" electrode. Electrodes 25, 26, and 27 comprise first, second and third iterative arrays of "energizing" electrodes and are positioned in sequentially alternate arrangement between bands 28'. Electrodes 25 are connected by a lead 20 to a normally On source of energizing potential shown as HF generator 31. The energizing potential is at a sustaining level; thus, during periods between operating cycles, any glow discharges which have been entered into the tube are held active by electrodes 25. Therefore, electrodes 25 are designated "holding" electrodes and each electrode 25 thus defines a discrete flow discharge position coresponding to an order of a binary word. Electrodes 26 and 27 are sequentially interposed between holding electrodes 25 and are connected, by leads 21 and 22, to respective, normally Off, HF generators 32 and 33. Electrodes 26 and 27 perform the shifting of a glow discharge from one holding electrode to the next and are therefore designated "shifting" electrodes. A pair of "stabilizing" electrodes, shown as internal electrodes 29 in Fig. 1, provide a constant glow discharge in the input end of the tube. The stabilizing electrodes maintain a substantially constant quiescent ionization level in the tube and also prime a "transfer" electrode 24. Transfer electrode 24 is connected by a lead 23 to a normally Off HF generator 30. When the transfer electrode is energized, by a sustaining potential from HF generator 30, it picks up a glow from electrodes 29 and primes the first holding electrode 25(1), thus providing entry into the shifting register. Operation of the gas tube register will be described in more detail after the following discussion of the elements comprising the energizing circuit.

Figure 2:
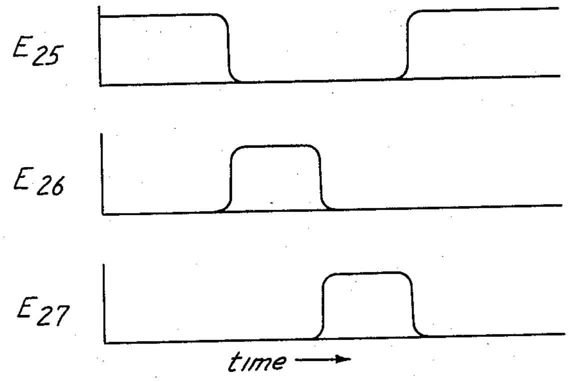
Fig. 2 is a timing diagram of a one-cycle shift sequence of the device of Fig. 1.

The energizing circuit comprises HF generators 30 to 33, and LF generator 38. These generators are controlled by a circuit comprising a trigger circuit 34, and univibrators 35 and 36. Trigger circuit 34 may be, for example, an ordinary Eccles-Jordan type of bistable circuit such as shown in Fig. 2.36 of "Electronics," by Elmore and Sands, National Nuclear Energy Series, Division V, volume 1, McGraw-Hill, 1949. Univibrators 35 and 36 are of the well-known type which provide an output pulse of selectable duration in response to each input pulse. A suitable univibrator is shown in Fig. 2.33 of the above reference.

Figure 4:
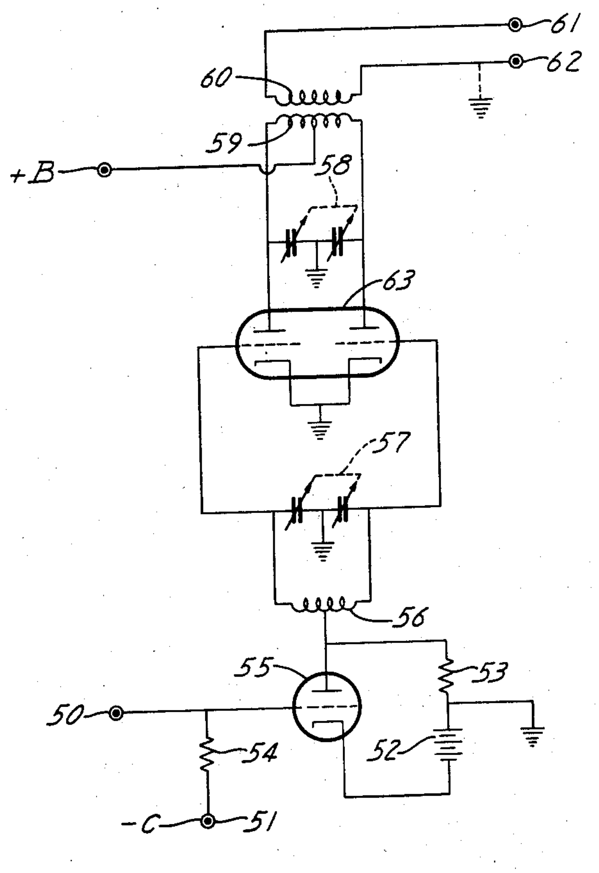
Fig. 4 is a schematic diagram of a suitable signal generator.

The energizing signal generators 30 to 33 and 38 may take a variety of forms. One suitable embodiment of signal generator is shown in Fig. 4. A tube 63, shown for example as a duotriode, is connected in a tuned-plate, tuned-grid oscillator circuit. A keying tube 55 is provided to control the oscillator. By suitable selection of the potential of a keying tube control grid bias source —C, the generator can be operated either as normally Off or normally On. Consider, for example, the case where battery 52 is 250 volts and the bias potential —C is also 250 volts. Since the keying tube grid and cathode are then at the same potential, the tube 55 will normally conduct, thereby applying a relatively high negative potential, or blocking bias, through a grid tank coil 56 to the grids of the oscillator tube 63, thus rendering the oscillator inoperative. A negative potential of suitable level applied to a terminal 50 will key the circuit to operation by cutting off conduction in the keying tube 55, thereby removing the blocking bias from the oscillator grids. The signal generator may be operated as normally On by adjusting the bias potential —C to keep the keying tube 55 at cutoff and thus the oscillator in operation. A positive potential applied to terminal 50, under these conditions, causes the keying tube to conduct thereby biasing the oscillator to an inoperative or Off state.

Output is taken from the signal generator at a pair of terminals 61 and 62 connected to a coil 60 that is coupled to a plate tank coil 59; terminal 62 is grounded when single-ended output is desired. The tank circuit constants of the oscillator are, of course, chosen to give the appropriate signal frequency; i.e., a relatively low frequency in the case of LF generator 38 (Fig. 1) and a relatively high frequency for HF generators 30–33. As previously discussed, the optimum energizing and quench frequencies are dependent on the physical characteristics of the glow shifting tube.

Figure 3:
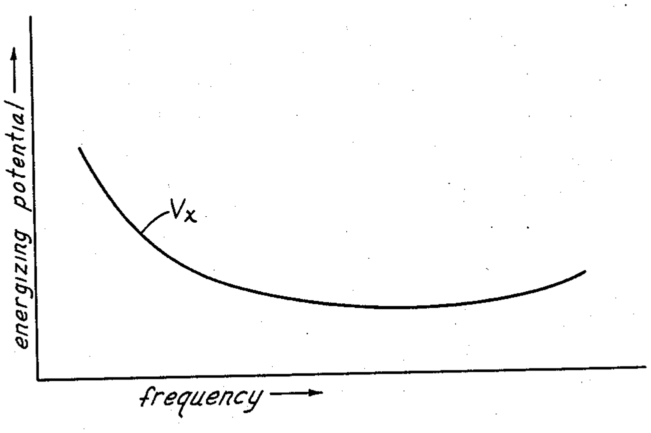
Fig. 3 shows generally how energizing potential varies with applied frequency.

In an example of parameters of the embodiment shown in Fig. 1, the tube is 3 mm. outside diameter (0.6 mm. wall thickness) glass tubing filled with neon to a pressure of 7.5 mm. of Hg. The electrodes are No. 18 wire rings spaced about one-quarter inch apart. Energizing frequencies are not critical, and frequencies above 10 megacycles may be conveniently employed. Below about 10 megacycles, impractically high energizing voltages are required for the tube of the present example. Thus, an energizing potential of about 30 megacycles at about 100 volts R.M.S. is used as a compromise between the high voltages required at lower frequencies (see Fig. 3) and the problems, such as stray capacity effects and difficulties in generating power, attending with the use of very high frequencies. Also, for a given tube, as the energizing frequency is raised, the energizing voltage required may become impratically high, and the ratio of breakdown voltage to extinction voltage may also become impractically low. The general shape of a curve comparing energizing potential vs. frequency is shown in Fig. 3.

The optimum frequency of the quench potential is considerably lower than the frequency of the energizing potential. In the present example the most advantageous quench potential is found to be about 100 volts R.M.S. in the range of 1.5 to 2.5 megacycles.

It should be noted that the quench generator 38 (Fig. 1) is in series with the energizing generators 30 to 33. Therefore, generator 38 should present a low impedance to the energizing frequency and, conversely, the energizing generator should present a low impedance to the quench frequency. Also, in the circuit shown in Fig. 1, the keying tube 55 (Fig. 4) and its circuit are not required since the quench generator operates continuously.

Operation of the gas tube shifting register of Fig. 1 will now be described in detail by assuming, for example, that it is desired to enter the binary word 101 into the tube. The word may be entered either lowest or highest order first.

At the beginning of each digit interval or shift cycle, a shifting pulse from a suitable source is applied to a lead 45. This shifting pulse may be a clock pulse from an associated computer as, for example, from terminal "OP" (Fig. 35) of copending application Serial No 458,473, filed September 27, 1954, by George B. Greene et al. A shifting pulse source is illustrated in Fig. 1 by a battery 42, a capacitor 41 and a single-pole, double-throw switch 40. When switch 40 is momentarily closed to the right, a pulse is applied to lead 45. This pulse sets trigger circuit 34 and simultaneously triggers univibrator 35. The HF generator 31 is normally On to thereby apply a holding potential to holding electrodes 25 through lead 20. When trigger circuit 34 is set by the shifting pulse it keys HF generator 31 Off, thereby removing the holding potential from electrodes 25, as shown graphically by the HF envelope $E_{25}$ in Fig. 2. At the same time, HF generator 32 (Fig. 1), which is normally Off is keyed On by univibrator 35, thereby applying a potential $E_{26}$ (Fig. 2) to the shifting electrodes 26. When univibrator 35 (Fig. 1) returns to its normal state, HF generator 32 returns to its normal Off condition.

In returning to its normal state univibrator 35 generates a pulse which is transmitted through a lead 37 to trigger univibrator 36. Univibrator 36 transmits a keying potential to HF generator 33, thereby energizing shifting electrodes 27 by applying potential $E_{27}$ (Fig. 2) through lead 22 (Fig. 1). The triggering potential from univibrator 36 is also applied to a lead 43 which is connected to a switch 39 in the input of HF generator 30. Switch 39 is the value input switch, shown by way of illustration as a manually operated switch. Obviously, it may be an electronic switch or gate appropriately controlled; as, for example, from the 1's transfer bus (Fig. 32) of the above-mentioned copending application Serial No. 458,473. In any given digit interval, if the value to be entered is a "1" then switch 39 is closed. Conversely, switch 39 is left open if the value to be entered is a "0."

In the present instance, it is assumed that the binary word 101 is to be entered. Thus the value for this first digit interval is a "1" and therefore switch 39 is closed to apply the keying potential from univibrator 36 to normally Off HF generator 30. The output of HF generator 30 is connected to the transfer electrode 24 through a lead 23. When energized the transfer electrode 24 picks up a glow from the stabilizing electrodes 29. When univibrator 36 returns to its normal state, shifting electrodes 27 and transfer electrode 24 are de-energized; a pulse is transmitted from univibrator 36 through a lead 44 to reset the trigger circuit 24, thereby keying HF generator 39 On and returning the holding potential ($E_{25}$, Fig. 2), to holding electrodes 25. The first holding electrode 25(1), adjacent the transfer electrode 24, is primed by the energized condition of the transfer electrode. Upon being re-energized, the holding electrode 25(1) captures and holds a glow discharge to represent the entered "1" value. This glow discharge at electrode 25(1) primes the adjacent shifting electrode 26(1).

The second digit in the binary word 101 is a "0," to be entered during the second digit interval, or shifting cycle. As before, momentarily closing switch 40 to the right energizes lead 45 to initiate a shifting cycle. The HF generator 31 is keyed Off and HF generator 32 is keyed On. Since shifting electrode 26(1) is primed, the "1"-representing glow discharge is shifted from electrode 25(1) to 26(1). When univibrator 35 returns to its normal state, HF generator 32 is keyed Off and HF generator 33 is keyed On, and the glow discharge representing the value "1" therefore shifts from electrode 26(1) to electrode 27(1). The keying pulse from univibrator 36 appears on lead 43; however, since the value to be entered in the present digit interval is a "0," switch 39 is left open and transfer electrode 24 remains de-energized. Univibrator 36 now returns to its normal state, de-energizes shifting electrodes 27, and develops a pulse on lead 44 to reset trigger circuit 34 and return the energizing potential to holding electrodes 25. Consequently, the single glow discharge is further shifted from electrode 27(1) to 25(2). Therefore, at the end of the second shift cycle, a glow discharge held at electrode 25(2) represents the input digit "1" of the first digit interval and the absence of a glow at holding electrode 25(1) represents the input digit "0" of the second digit interval.

The highest-order digit of the example word 101 is a "1," and this digit is entered into the shifting register tube in the manner described above in relation to the lowest order digit "1." Thus, at the end of three digit intervals, the word 101 is represented by a glow at electrode 25(3), no glow at electrode 25(2) and a glow at 25(1). If successive shift pulses are now applied to lead 45, it is clear that the established glow pattern will be shifted by one position to the right during each shifting cycle until eventually it reaches the rightmost end of the tube. Readout from the register is shown in the form of a photoelectric tube 48 positioned to detect a glow held by electrode 25(*n*). The glow pattern is shifted through electrode 25(*n*) and is lost, with the readout device detecting each glow and giving an output at terminal 46 in response thereto. The example word 101 thus appears on terminal 46 in the same order as entered, with "1's" represented by an output signal and "0's" represented by an absence of such an output signal.

The LF generator 38 continually applies a quenching potential between reference electrodes 28′ and each energizing electrode 24 to 27. Therefore, the quenching signal is continually active to disperse any ionization and thus to decrease the glow decay time, permitting at least a three fold increase in operating speed.

It is clear that the quenching signal as applied in Fig. 1 not only acts to disperse a decaying glow discharge but it also acts upon a sustained glow. For this reason somewhat more power is, in general, required of the energizing generators in the embodiment shown in Fig. 1 to overcome the influence of the quenching signal when a glow is shifted or held.

Figure 5:
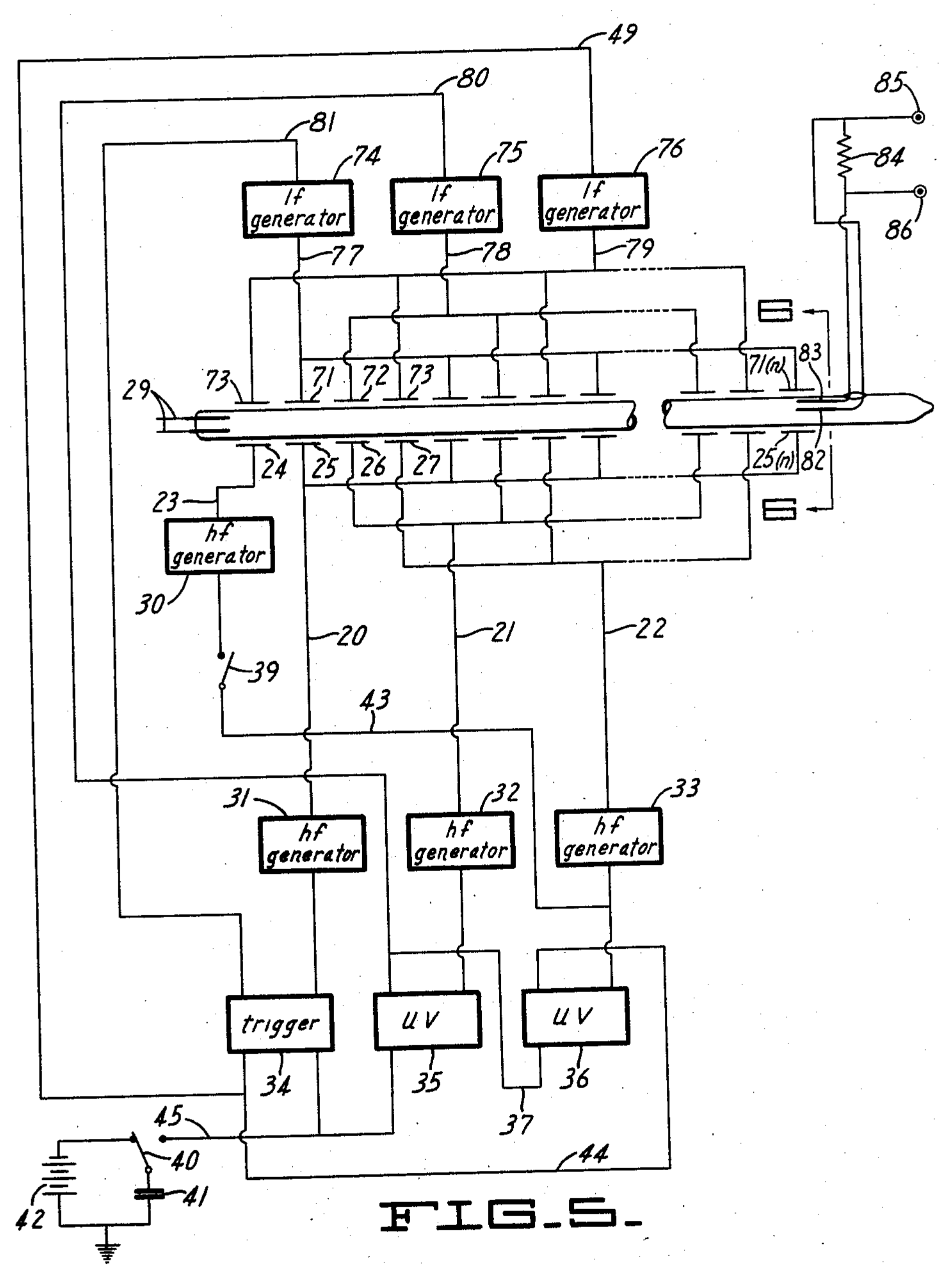
Fig. 5 is an illustration of a glow discharge shifting tube and a block diagram of an energizing circuit for providing selective quenching.
Figure 6:
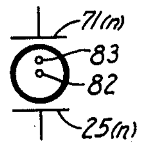
Fig. 6 is a cross section of the tube of Fig. 5 along the lines 6—6 showing the placement of the internal readout electrodes.

The power loss due to the necessity of overcoming the quenching signal is eliminated in the embodiment shown in Fig. 5 through the use of a technique of selective quenching; i.e., only the unexcited electrodes are subjected to a quenching signal. The glow shifting tube of Fig. 5 also employs a transverse electrode structure to obtain a relatively high capacity between electrodes and the gas in the tube. The increased capacity improves the quenching. These external electrodes may be formed of any conducting material. Where the tube is formed of 6 mm. glass tubing and filled to a pressure of 7.5 mm. of Hg with neon, electrodes about one-quarter inch wide, spaced from each other about three-sixteenths of an inch and formed to the curvature of the tube along approximately one-quarter of the circumference are found satisfactory. Alternatively, the electrodes may be plane and of approximately the outside diameter of the tube in length as illustrated in Fig. 6.

The energizing circuit of this embodiment is similar to the energization circuit of Fig. 1. Transfer electrode 24 is positioned near the end of the tube so that it is primed by the stabilizing electrodes 29. Holding electrodes 25 and shifting electrodes 26 and 27 are positioned along the tube in a sequentially alternate arrangement and connected to respective energizing generators 31 to 33. A similar electrode structure comprising a plurality of reference electrodes 71, 72 and 73 is arranged along the opposite side of the tube with electrodes 71, 72 and 73 positioned to cooperate respectively with electrodes 25, 26 and 27. One of the electrodes 73 is positioned to cooperate with the transfer electrode 24. Each electrode array 71, 72 and 73 is connected, by a respective lead 77, 78 and 79 to a respective quench frequency generator 74, 75 or 76. The quench generators are connected by respective leads 81, 80 and 49 to appropriate points in the control circuit, and are controlled together with, but inversely to the energizing generators 31, 32 and 33. For example, quench generator 74 is Off when energizing generator 31 is On and vice versa.

Figure 7:
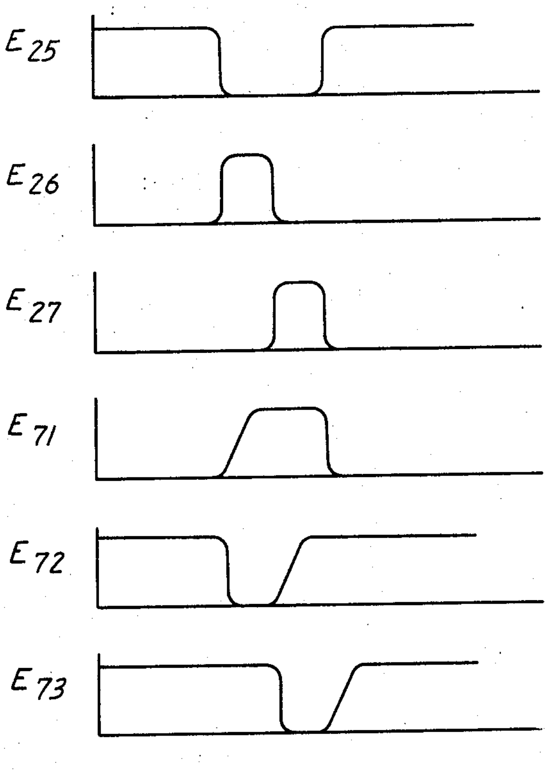
Fig. 7 is a timing diagram of a one-cycle shift sequence of the device of Fig. 5.

Fig. 7 illustrates typical operating potential envelopes for a one-shift cycle of the register of Fig. 5. The holding potential $E_{25}$ and the quench potentials $E_{72}$ and $E_{73}$ are normally On. When the holding potential $E_{25}$ is keyed Off, the associated quenching potential $E_{71}$ is keyed On. The first shifting potential $E_{26}$ is also keyed On and the associated quench potential $E_{72}$ is keyed Off. Similarly, when the second shifting potential $E_{27}$ is keyed On, the associated quench potential $E_{73}$ is keyed Off. In each case, an energizing potential and its associated quench potential are inversely controlled so that only the decaying glow discharges are subjected to the quenching potential. Comparing the energizing potential envelope $E_{26}$ and the quench potential envelope $E_{71}$ (Fig. 7), for example, it is apparent that the quench potential generators are adjusted to give somewhat longer rise times than the energizing generators. This is to assure that any primed energizing electrode picks up a glow before the ionization is quenched to below priming level.

Fig. 5 also illustrates a pair of internal readout electrodes 82 and 83 positioned in the region of influence of the rightmost holding electrode 25(*n*). The use of internal readout electrodes rather than the photoelectric readout of Fig. 1 permits the vessel to be formed of any suitable material whether transparent or not. Also, it should be noted that the circular cross section of the glow discharge channel is not an essential feature of the invention. Glow discharge channels may, for example, be formed in ceramics or certain plastics and have square, rectangular, or other cross section. A cross-section view of the tube (Fig. 6) shows the axial location of these internal electrodes. It is seen that the readout electrodes are asymmetrically positioned in the tube; therefore, when a glow discharge is held between holding electrode 25(*n*) and reference electrode 71(*n*) the readout electrodes are in planes of different potential in the glow discharge plasma. This potential difference between the readout electrodes causes a current flow through a relatively high resistance 84. The consequent voltage drop across resistor 84 constitutes the readout signal, which is available at a pair of terminals 85 and 86.

Figure 10:
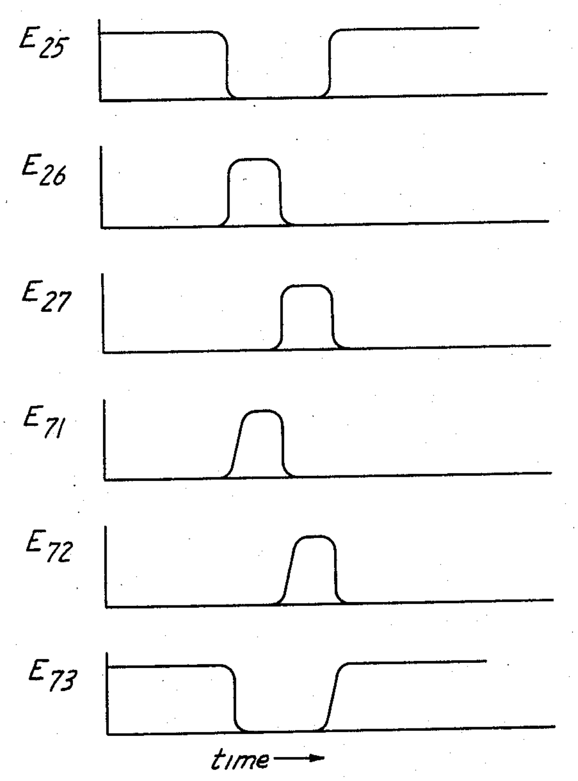
Fig. 10 is a timing diagram of a one-cycle shift sequence of the device of Fig. 8.
Figure 8:
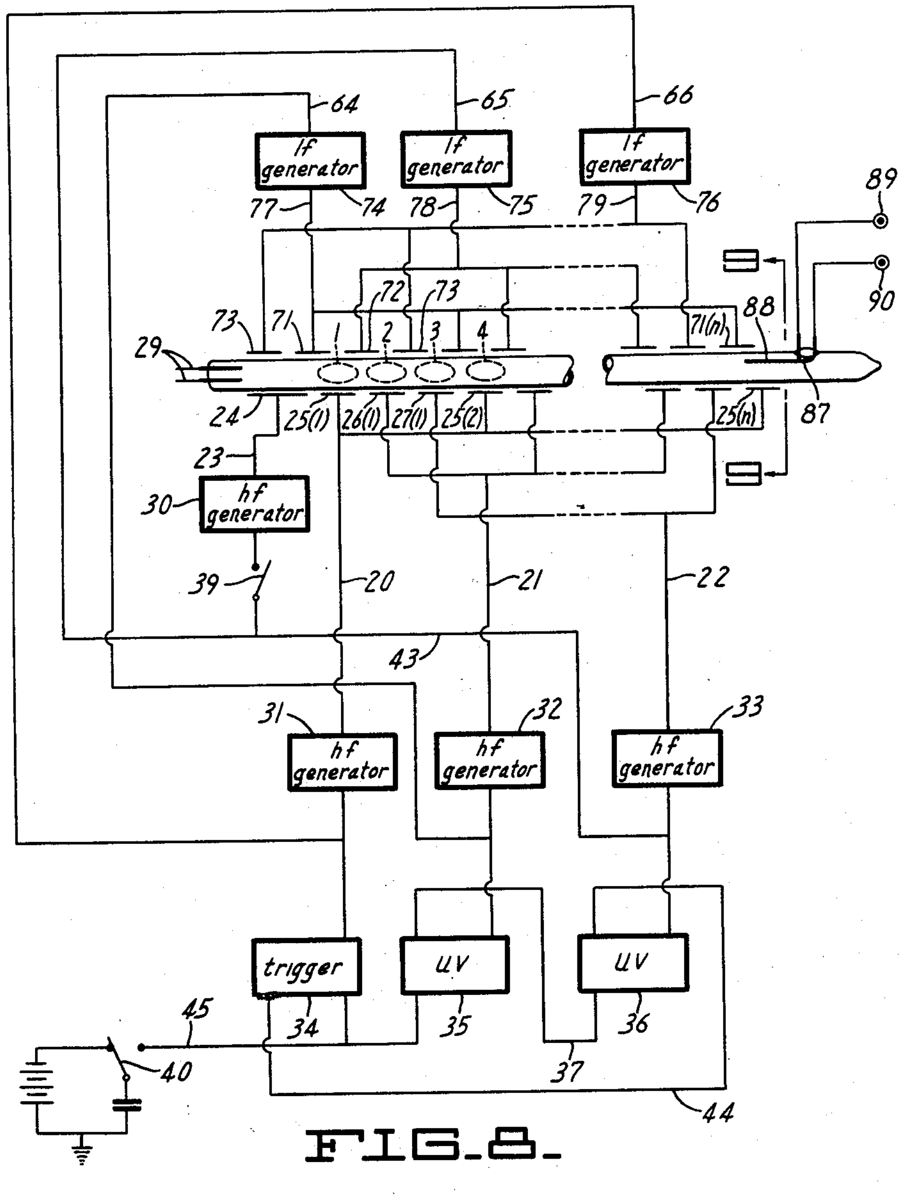
Fig. 8 is an illustration of an alternate form of a selectively quenched glow discharge shifting tube with a block diagram of associated operating circuitry.

Another form of a selectively quenched glow discharge shift register is illustrated in Fig. 8. As compared to Fig. 5, it will be noted that the reference electrodes 71, 72 and 73 are shifted laterally and positioned to overlap adjacent energizing electrodes. The control and energizing circuitry is similar to that of Fig. 5 with the exception of the control connections to the quench potential generators 74, 75, and 76. In the embodiment shown in Fig. 8, low frequency generator 76 is controlled together with HF generator 31 by the potential from the output of trigger circuit 34. Similarly, low frequency generator 74 is controlled together with HF generator 32 by an output from univibrator 35 and low frequency generator 75 is controlled together with HF generator 33 by univibrator 36. Therefore, as shown in the timing diagram of Fig. 10, the energizing potential $E_{25}$ and quench potential $E_{73}$ are normally On.

Glow discharges may be entered into the tube through the agency of transfer electrode 24 in the manner previously described. An entered glow discharge held by electrode 25(1) is illustrated by a dashed ellipse 1 within the tube. At the beginning of a shift cycle, potentials $E_{25}$ and $E_{73}$ are turned Off and potentials $E_{26}$ and $E_{71}$ are turned On. Thus the glow discharge steps to a position illustrated at 2 (Fig. 8). Subsequently, potentials $E_{26}$ and $E_{71}$ are turned Off and potentials $E_{27}$ and $E_{72}$ are turned On, thereby causing a further shift of the glow discharge to the position illustrated at 3. Finally, potentials $E_{25}$ and $E_{73}$ are returned and potentials $E_{27}$ and $E_{72}$ are turned Off, and at the end of the shift cycle, the glow discharge is held by electrode 25(2), as illustrated at 4.

Figure 9:
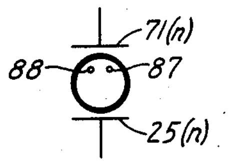
Fig. 9 is a cross section of the tube of Fig. 8 along the lines 9—9 showing the placement of an alternate form of internal readout electrodes.

Readout from the register of Fig. 8 is by way of a pair of internal electrodes 87 and 88. A cross-section view (Fig. 9) shows that these electrodes are symmetrically positioned in the tube; i.e. they are positioned in an equipotential plane. When electrode 25(*n*) is not holding a glow, a relative high impedance exists between a pair of output terminals 89 and 90 connected to respective readout electrodes. However, when electrode 25(*n*) is holding a glow, the impedance across output terminals 89 and 90 is relatively low. This impedance drop constitutes the output signal.

Figure 11:
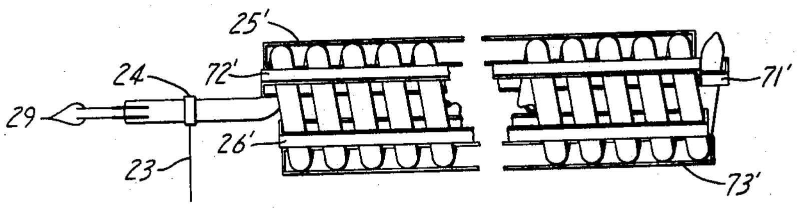
Fig. 11 is a front view of a glow discharge shifting tube in helical form with external electrodes arranged for selective quenching.
Figure 12:
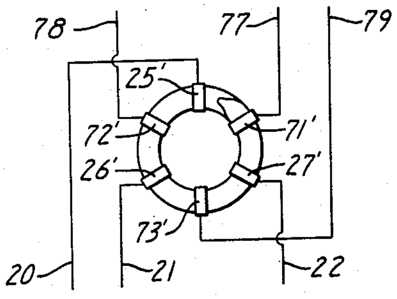
Fig. 12 is a right side view of the device shown in Fig. 11.

Figs. 11 and 12 illustrate a helical form of a glow discharge shifting tube adapted for selective quenching. The helical tube is essentially a "rolled up" axial field design and it offers particular advantages since its electrode structure is especially simple to construct. The electrodes are formed by strips or bands looped longitudinally around the turns of the helix. Fig. 12 is a right-end view of the tube as shown in Fig. 11. Fig. 12 shows the arrangement of electrodes and the connections to energizing and control circuitry. Such circuitry may be as shown in Fig. 8 and analogous reference numbers are accordingly applied to Figs. 11 and 12. For example, electrode 71′ of Fig. 12 is analogous to the electrodes 71 of Fig. 8.

Figure 13:
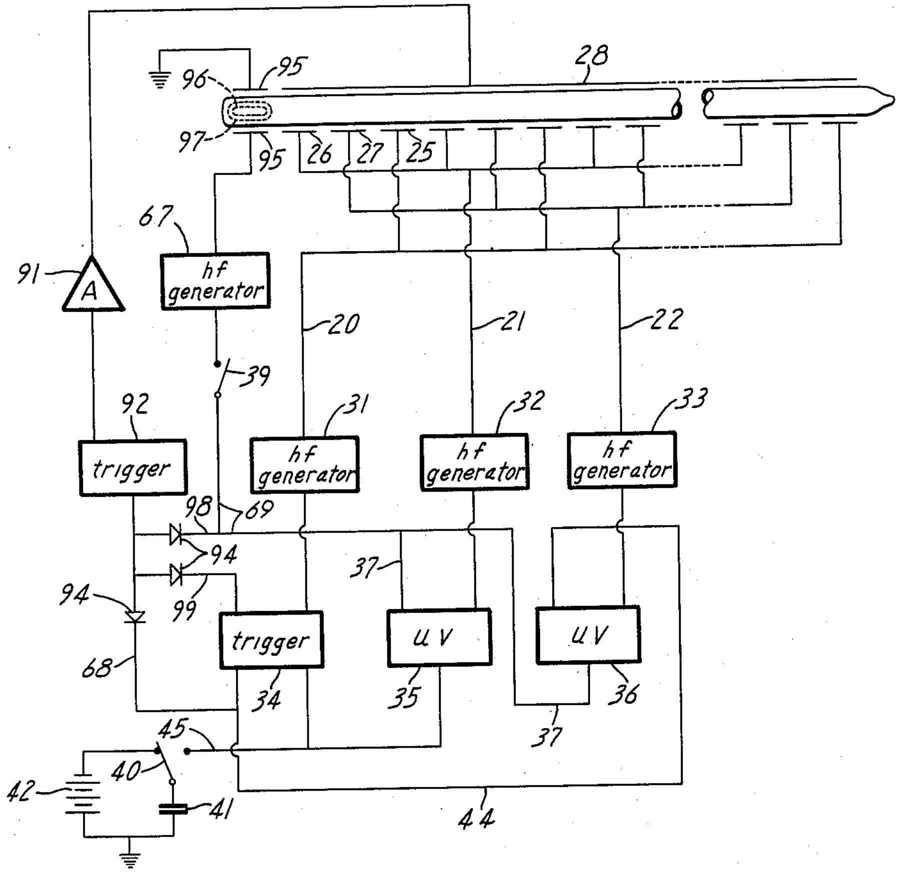
Fig. 13 is a diagramatic representation of a glow discharge shifting tube having no internal electrodes and a block diagram of an energizing circuit including circuitry for applying a D.C. quench voltage.

A further embodiment of the present invention, shown in Fig. 13, employs a change of D.C. potential level as the quench potential. The D.C. quench has the most desirable feature of the selective A.C. quench (Figs. 5 and 8) because only decaying glow discharges are subjected to the quench effect. The D.C. quench also has circuit simplicity comparable to the constant A.C. quench (Fig. 1).

The energizing circuit of Fig. 13, comprising HF generators 31 to 33, trigger circuit 34 and univibrator 35 and 36, is similar to that previously described for Fig. 1. However, input is obtained somewhat differently. In Fig. 13 the functions of keeping a glow alive in the tube and of entering values into the tube are combined, and the tube has no internal electrodes. A pair of input electrodes 95 are energized by a high frequency generator 67 which operates at either of two selectable output levels. At its normal output level, HF generator 67 applies a potential across electrodes 95 to maintain a small glow discharge illustrated at 96. The two-level HF generator 67 is controlled by an output of univibrator 35 through the previously described value input switch 39. Assuming switch 39 closed, when univibrator 35 is triggered to its abnormal state, a relatively high potential exists at its lefthand output. This potential is applied through a lead 69 and switch 39 to bias generator 67 to a higher output level. The higher output across electrodes 95 causes the maintained glow 96 to expand as illustrated at 97, and the first shifting electrode 26 is thereby primed. Since the shifting electrodes 26 are energized by the action of univibrator 35, simultaneously with the biasing of generator 67 to its higher level, shifting electrode 26 picks up a glow which is shifted successively to the second shifting electrode 27 and then to the first holding electrode 25.

Figure 15:
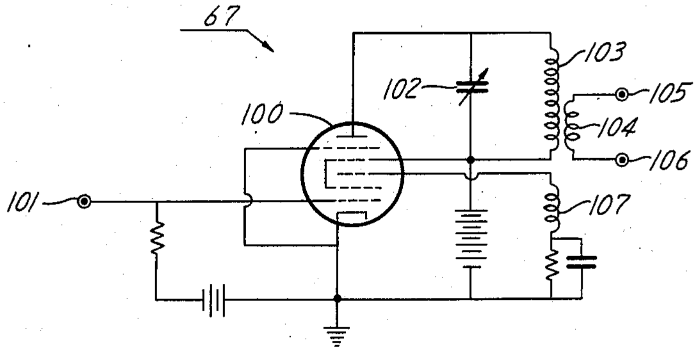
Fig. 15 is a schematic diagram of a two-level signal generator.

An example of a two-level HF generator 67 is shown schematically in Fig. 15. A pentagrid tube 100 is arranged in a tuned-plate oscillator circuit having a plate tank circuit which comprises a capacitor 102 and a coil 103. A feedback winding 107 is connected to the third grid. Output is taken from a pair of terminals 105 and 106 connected to a secondary winding 104. Terminal 106 is normally grounded for single-ended output. A terminal 101 is connected through switch 39 (Fig. 13) to an output of univibrator 35. Thus, the output of univibrator 35 controls the bias on the first grid of tube 100 (Fig. 15). A change in the bias on the first grid causes a corresponding change in transconductance of the tube and hence a change in its output level.

The D.C. quench circuit of Fig. 13 comprises a quench control trigger circuit 92 which controls the output level of an amplifier 91. The output of amplifier 91 is connected to a reference electrode 28 common to all the energizing electrodes. The D.C. potential change required for quenching is only about 150 volts in the present example; therefore, it is possible to eliminate amplifier 91 and obtain the quench voltage directly from the trigger circuit. However, the arrangement shown eases the design requirements. The D.C. voltage must change rapidly for effective quenching; consequently, the output of the quench circuit connected to electrode 28 should have a low time constant. On the other hand, the quench circuit output must present a low impedance to the energizing signals from HF generators 31 to 33. These requirements are readily met through the use of amplifier 91 which may be designed with a low output impedance while still supplying the necessary voltage change.

Figure 16:
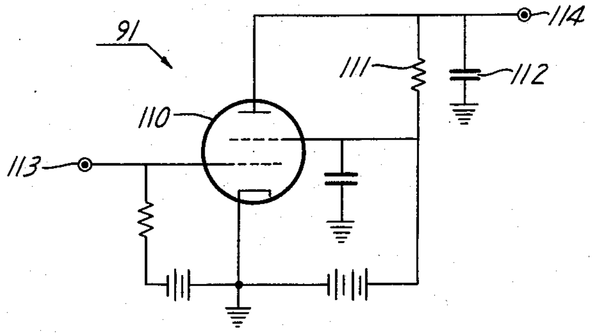
Fig. 16 is a schematic diagram of a D.C. amplifier for use with the device of Fig. 13.

An example of an amplifier 91 is shown schematically in Fig. 16. A pentode tube is shown with a plate load resistor 111 and a bypass capacitor 112 which provides a low impedance to the energizing potentials. An output terminal 114 is connected to the reference electrode 28 (Fig. 13) and an input terminal 113 (Fig. 16) is connected to an appropriate point of the quench control trigger circuit 92 (Fig. 13), for example, to the control grid of one of the trigger circuit tubes or to an appropriate potential point of a grid resistor.

Figure 14:
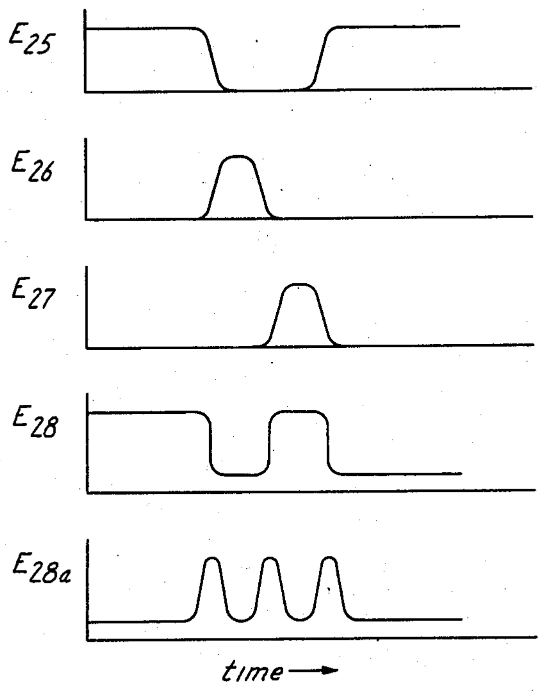
Fig. 14 is a timing diagram of a one-cycle shift sequence of the circuit of Fig. 13.

Operation of the D.C. quenched shifting register of Fig. 13 may be better understood by reference to Fig. 14 wherein the potentials applied to the tube during a one-cycle shift sequence are graphically shown. As in the previously discussed embodiments, a pulse is applied to lead 45 (Fig. 13) to initiate a shift cycle. This pulse sets trigger circuit 34 and triggers univibrator 35 to its abnormal state. The HF generator 31, connected to the holding electrodes 25, is keyed Off by trigger circuit 34 as shown by $E_{25}$ (Fig. 14). A negative output pulse on a lead 99 (Fig. 13) from the left side of trigger circuit 34 is transmitted through a diode 94 to the symmetrical input of the quench control trigger circuit 92. The trigger circuit 92 is thereby reversed to change the D.C. output level of amplifier 91 as shown by $E_{28}$ (Fig. 14). The HF generator 32 (Fig. 13) is now keyed On by the action of univibrator 35 to apply an energizing potential to the first shifting electrodes as shown by $E_{26}$ (Fig. 14). It may thus be seen that the D.C. quench level is changed after energization is substantially removed from one group of electrodes and before complete energization is applied to the next adjacent group of electrodes. In other words, it is a change in D.C. potential applied between the envelopes of HF energization which is effective to quench the decaying glow discharges. It should be noted that the time constants associated with the various circuit elements may be adjusted to give the delays necessary to obtain the sequence of events described.

When univibrator 35 returns to its normal state, HF generator 32 is keyed Off and a negative pulse is developed on lead 98; this pulse reverses trigger circuit 92 to again change the D.C. quench voltage level. The output pulse from univibrator 35 also is applied over lead 37 to trigger univibrator 36 to its abnormal state. Univibrator 36 keys HF generator 33 to On for energizing the second shifting electrodes 27 as shown by $E_{27}$ (Fig. 14). A one-shift cycle is completed after univibrator 36 (Fig. 13) returns to its normal state, which keys HF generator 33 to Off, again reverses the quench control trigger circuit 92 over leads 44 and 68, and resets trigger circuit 34 to key On the HF generator 31 and return the holding potential $E_{25}$ (Fig. 14).

The circuit of Fig. 13 may be modified to provide another type of D.C. quench which might more appropriately be called "pulse quench." Trigger circuit 92 is removed and the outputs of diodes 94 are joined and connected through a capacitor (not shown) to the input of amplifier 91. Amplifier 91 thus becomes a pulse amplifier and therefore every negative pulse applied through diodes 94 causes a positive quench pulse on the reference electrode 28. Consequently, a quench pulse is applied between energizing potential envelopes as is illustrated by the potential $E_{28a}$ in the timing diagram of Fig. 14.

Quenching by a change in D.C. potential may be employed in the previously described embodiments of shifting registers. For example, in Figs. 5 and 8, it is necessary only to replace each low frequency generator 74, 75 and 76 with a trigger circuit 92 (Fig. 13) and its associated amplifier 91.

Likewise, pulse quench may be employed in the embodiments of Figs. 5 and 8 by replacing each low frequency generator 74, 75 and 76 with a capacitively coupled amplifier 91. In this case it is necessary to add an appropriately oriented diode in series with each control lead 49, 80 and 81 (Fig. 5) or 64, 65 and 66 (Fig. 8), since a quench pulse is desired only when an energizing generator is turned Off. For example in Fig. 5 when HF generator 31 is keyed Off a quench pulse should be applied to electrodes 71; however, when HF generator is returned On, the electrodes 71 should not be quenched, for such a quench would operate against the excitation potential. It should be noted that the polarity of a quench pulse is immaterial. Positive or negative pulses appear to be equally effective.

Figure 17:
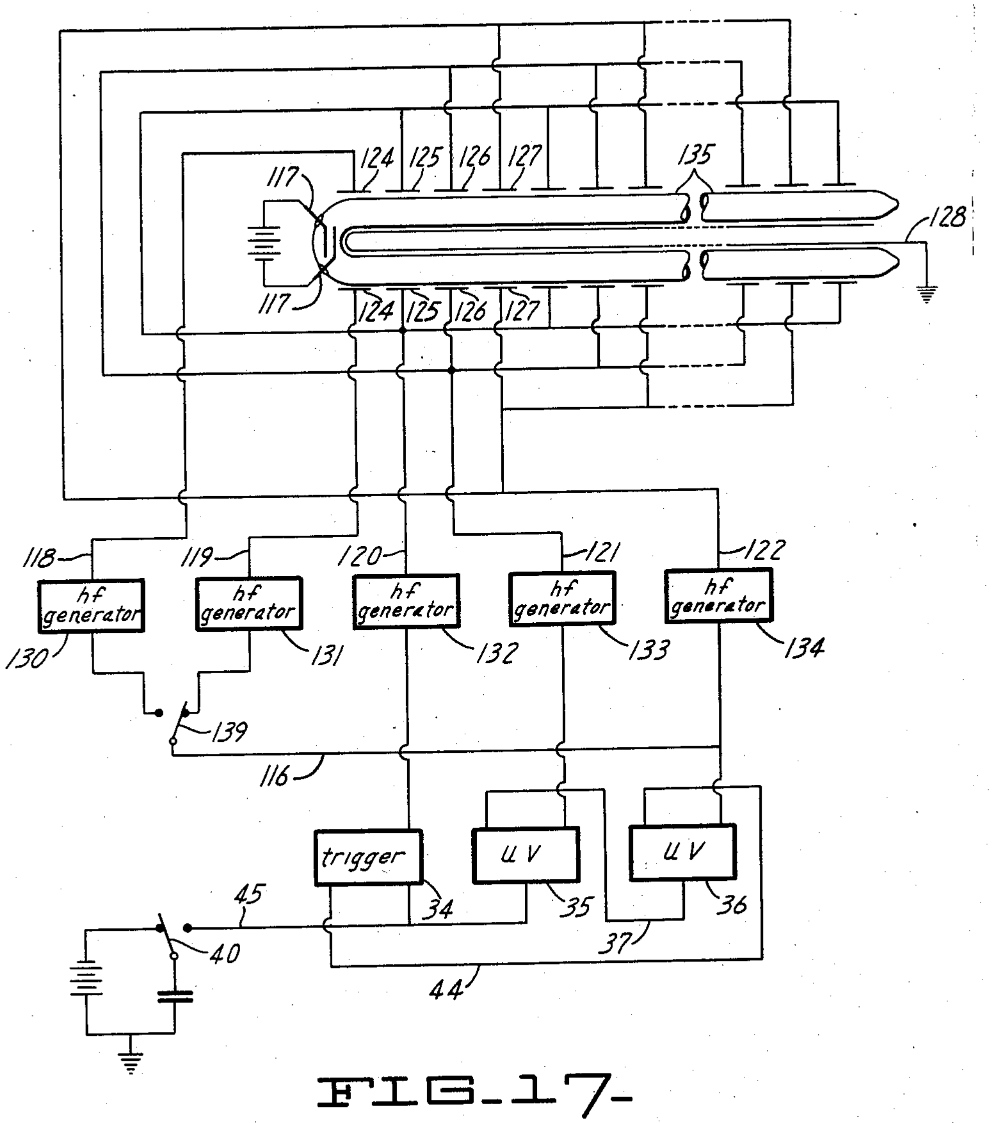
Fig. 17 is an embodiment of the invention for simultaneously registering a word and its complement.

An arrangement for simultaneously registering a word and its complement is shown in Fig. 17. An envelope 135 forms two glow discharge register channels having a common gaseous atmosphere. A common gaseous atmosphere is not essential but it is desirable, because the consequent uniformity of the gas in both channels assures more uniform operation. The two registers are, in effect, connected in parallel except for respective transfer electrodes 124. These electrodes are driven from respective HF generators 130 and 131 which are controlled in a complementary fashion. During a given shift cycle, if an input switch 139 is closed to the right (as shown), a glow is entered into the lower register and a complementary "no-glow" is entered into the upper register. Conversely, if switch 139 is closed to the left, a no-glow is entered into the lower register and a glow into the upper register. Thus, if a glow discharge exists at a given position in one register, a no-glow exists at the corresponding position in the other register. A distinct advantage of the complement tube arrangement is that the number of glow discharges existing in the registers is constant; therefore, the loading on the driving generators is constant. Another important feature of the complement tube arrangement is the possibility of a simple error-checking output circuit since the sum of the values in each channel in any order should always be "1."

As previously stated, quenching may be provided by a change, at an appropriate time, in the level of a D.C. potential applied to an electrode. In the complement register arrangement of Fig. 17, the HF generators comprise a novel circuit which also develops the D.C. quench potential. A grounded reference electrode 128 is positioned to co-operate with all the excitation electrodes, because, in this case, both the excitation and quench potentials are applied to the excitation electrodes.

Figure 18:
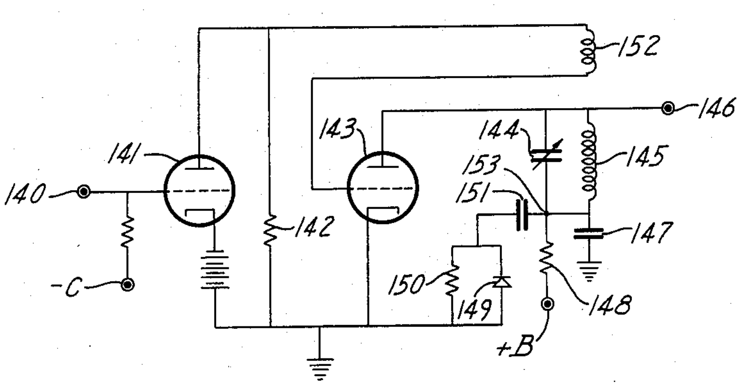
Fig. 18 is a schematic diagram of a signal generator as employed in the device of Fig. 17 for developing both a high frequency energizing potential and a D.C. quench potential.

A schematic diagram of HF generators 130 to 134 (Fig. 17) is shown in Fig. 18. The circuit comprises an oscillator tube 143 and a control tube 141. A coil 145 and a capacitor 144 form the oscillator tank circuit and a coil 152 coupled to the tank coil provides feedback to the oscillator grid. The control tube 141 operates in a manner analogous to control tube 55 (Fig. 4), previously described. Control tube 141 has in its plate circuit the grid leak of the oscillator, a resistor 142. The oscillator may be operated normally Off by adjusting a bias power supply −C to allow the control tube to conduct sufficiently developing an oscillator cutoff bias potential across resistor 142. If a negative potential is applied to a control input terminal 140 under these conditions, the control tube is cut off and the oscillator goes into operation. The oscillator may be operated normally On by adjusting the power supply −C to cutoff for the control tube 141. A positive input potential to terminal 140 now causes the control tube to conduct and the oscillator is thereby biased Off.

Output is taken from the oscillator by a direct connection from the plate of the tube to an output terminal 146. In Fig. 17, the output terminal of each HF generator 130 to 134 is connected directly to a respective group of electrodes 124 to 127. Thus there is direct current coupling from an electrode (or from an array of electrodes) through the tank coil 145 (Fig. 18) and through a resistor 148 to a plate supply source +B. When the oscillator is On it draws current through resistor 148. Therefore, the D.C. voltage on the electrodes is the value of +B minus the drop across resistor 148. However, when the oscillator is keyed Off, the D.C. voltage on the electrodes rapidly rises to substantially the value of +B. It is this D.C. rise which is effective as a quench potential in the register of Fig. 17, and quenching is desired just subsequent to the removal of an energizing potential from an electrode.

It is clear, however, that when the oscillator is again keyed On, there is a D.C. drop on the electrodes which is also effective as a quench potential. This is undesirable because, in this event, the quench potential is operating against the energizing potential; i.e., the energizing potential operates to ionize the gas while at the same time the drop in D.C. level operates to quench or disperse the ionization. It has been found that for a change in D.C. potential to be effective as a quench potential the change must be quite rapid. Thus, what is desired is a rapid change in D.C. level when an oscillator is keyed Off and a relatively slow D.C. change when an oscillator is keyed On. This is accomplished by a circuit comprising a capacitor 151 (Fig. 18) having one end connected to a junction 153 between coil 145 and resistor 148, and having its other end connected through a resistor 150 and a diode 149, in parallel, to ground.

When the oscillator is keyed Off, the D.C. voltage at junction 153, and thus at terminal 146, rises rapidly to substantially the value of the supply +B, since the effect of capacitor 151 is limited by resistor 150. When the oscillator is keyed On, the potential at junction 153 tends to drop; however, through diode 149, the capacitor 151 is now effective to decrease the rate of fall of the potential at junction 152 and therefore to decrease the rate of potential change on the electrodes.

Figure 19:
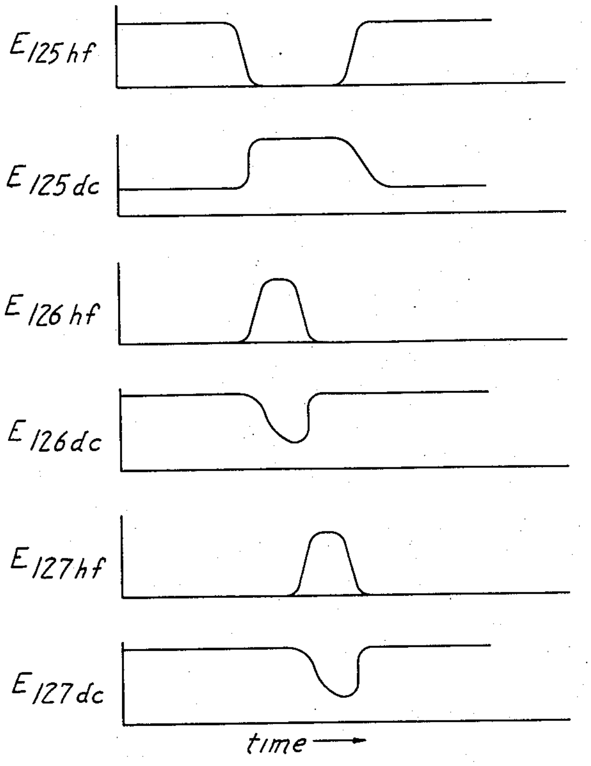
Fig. 19 is a timing diagram of a one-cycle shift sequence of the device of Fig. 17.

The relationship of the energizing potentials and the direct current potentials on the electrodes is illustrated in the timing diagram (Fig. 19) of a one-cycle shift sequence of the device of Fig. 17. For example, when the energizing potential on electrodes 125 ($E_{125hf}$) is removed, the D.C. potential on these electrodes rises rapidly as illustrated by $E_{125dc}$. However, when the energizing potential $E_{125hf}$ returns, the concurrent drop of $E_{125dc}$ is relatively slow.

Figure 20:
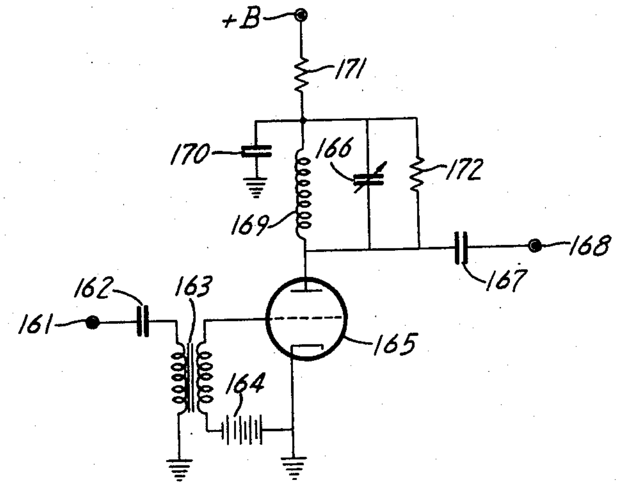
Fig. 20 is a schematic diagram of a damped wave quench frequency generator.
Figure 21:
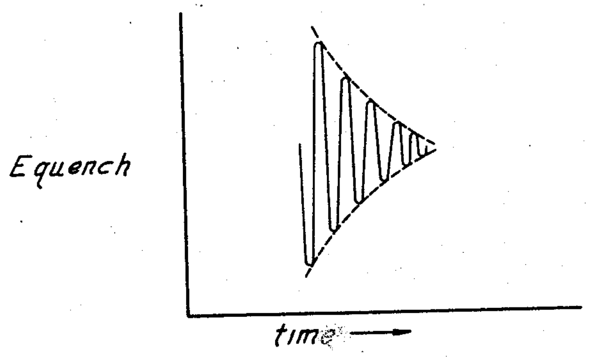
Fig. 21 is an illustration of an output waveform of the generator of Fig. 20.

An alternate type of quench potential generator is shown in Fig. 20. It includes, basically, a pulse-excited, parallel-resonant tuned circuit comprising a coil 169 in parallel with a capacitor 166 in the plate circuit of a triode 165. The triode 165 is biased to cutoff by a potential source 164, and is driven through a pulse transformer 163. Thus, a pulse on an input terminal 161 is amplified by the triode, the amplified pulse excites the tuned circuit. The oscillation of the tuned circuit is damped at a controlled rate by a resistor 172 in parallel with capacitor 166, and is coupled through a capacitor 167 to an output terminal 168. The damped wave output of terminal 168 is illustrated in Fig. 21. The considerations as to frequency and amplitude of A.C. quench potentials previously discussed are pertinent here. The initial amplitude of the damped wave must be low enough not to cause appreciable ionization, and the frequency must be low enough to cause displacement oscillations of sufficient magnitude to sweep out and diffuse the glow discharge plasma. The parameters of the circuit of Fig. 20, particularly of resistor 172, may be adjusted to give the desired damping rate.

The damped wave quench generator may be employed as a low frequency generator at 74, 75 and 76 in the circuits of Figs. 5 and 8. The damping rate may be adjusted so that the amplitude of the damped wave falls to about one-third of its initial value between input pulses to the individual damped wave generator. The damped wave generator may also be effectively employed in the register circuit of Fig. 13. In this case it replaces both trigger circuit 92 and D.C. amplifier 91. The output of diodes 94 is connected to the input terminal 161 of the damped wave generator and the output terminal of the damped wave generator is connected directly to the reference electrode 28 (Fig. 13).

It is to be noted that many other different combinations of shifting channels and driving circuits may be used. In other words, the particular driving circuits and shifting channel arrangements shown in the drawings are merely illustrative and a particular driver circuit is not limited in its use to the particular shifting channel that is shown. For example, the driving circuit of Fig. 13 may obviously be used with the shifting channel embodiments of Figs. 1, 11, and 17; and it may be employed with the shifting channel embodiments of Figs. 5 and 8 merely by connecting the quench electrode leads 77, 78 and 79 (Figs. 5 and 8) to the output of quench generator 91 (Fig. 13). Likewise it is clear that the damped wave quench generator of Fig. 20 may be substituted for the D.C. quench generator 91 (Fig. 13) in any of the above suggested arrangements. As a further example, D.C. quenching may be accomplished in the embodiments shown in Figs. 5 and 8 by replacing each of the low frequency generators 74, 75 and 76 with an amplifier such as shown in Fig. 16. If the amplifier is capacitively coupled to the control circuit, pulse quenching will be obtained.

I claim:

1. An information handling system comprising: a gaseous discharge device including an elongated gas-filled tube, a plurality of bands spaced along said tube and collectively forming a reference electrode, and a plurality of external energizing electrodes each interposed between reference electrodes and in discharge sustaining relation to said reference electrodes and connected in sequentially alternate arrangement in first, second, and third arrays; means for establishing a pattern of glow discharges in said tube; a cyclically operable circuit for sequentially energizing said arrays to shift said pattern; and a quenching potential generator connected to said reference electrodes for applying a quenching potential to the gas in said tube to thereby increase the maximum speed of shifting of said pattern.

2. An information handling system according to claim 1, wherein said quenching potential generator comprises a low frequency oscillator.

3. An information handling system comprising: a gaseous discharge device including a gas-filled channel in helical form, a plurality of energizing electrodes disposed longitudinally along the turns of the helix, a plurality of reference electrodes disposed longitudinally along the turns of the helix between successive energizing electrodes and in discharge sustaining relation to said energizing electrodes; a circuit for establishing and shifting a pattern of glow discharges in said channel including means for sequentially applying energizing potentials to said energizing electrodes; quenching potential generating means; and means for sequentially applying the quenching potential to said reference electrodes in a predetermined time relation to the application of said energizing potentials to the energizing electrodes to thereby increase the maximum speed of shifting of said pattern.

4. An information handling system comprising: a gaseous discharge device including a gas-filled envelope in helical form, first, second, and third energizing electrodes disposed longitudinally along the turns of the helix, first, second, and third reference electrodes disposed logintudinally along the turns of the helix and in alternate arrangement with said energizing electrodes and in discharge sustaining relation to said energizing electrodes; means for establishing and shifting a pattern of glow discharges in said envelope including a separate energizing potential generator connected to each energizing electrode, and a circuit for sequentially actuating said energizing potential generators; and quenching means including a separate quenching potential generator connected to each reference electrode, and means for actuating said quenching potential generators in timed relation to the actuation of said energizing potential generators to thereby increase the maximum speed of shifting of said pattern.

5. An information handling system according to claim 4, wherein each of said quenching potential generators is a damped wave generator.

6. A gaseous discharge detecting device comprising: an envelope containing an ionizable gaseous atmosphere; an external energizing electrode adjacent said envelope; a reference electrode positioned in discharge sustaining relation to said energizing electrode; selectively operable means for priming the region of said atmosphere between said energizing and said reference electrode; energizing means for sustaining a glow discharge in said region subsequent to a priming of said region; a pair of output terminals; and a pair of internal electrodes projecting into said region and connected to said terminals for detecting said glow discharge.

7. A gaseous discharge detecting device according to claim 6, wherein said internal electrodes are positioned in an equipotential plane of said region.

8. A gaseous discharge detecting device according to claim 6, wherein said internal electrodes are positioned in planes of different potential in said region.

9. An information handling system comprising: a gaseous discharge device including a plurality of iterative arrays of energizing electrodes with each energizing electrode positioned in priming relation to adjacent energizing electrodes, means forming a reference electrode position in discharge sustaining relation to the energizing electrodes, and an ionizable medium between said means forming a reference electrode and said energizing electrodes; energizing potential generating means connected to said arrays of energizing electrodes; means controlling said energizing potential generating means to sequentially energize and de-energize said arrays of energizing electrodes; and quenching means comprising a direct current source having alternate potential levels connected to said means forming a reference electrode, and a control circuit connected to said direct current source for changing from one of said potential levels to another upon the de-energization of any one of said arrays of energizing electrodes to thereby increase the maximum speed of operation of said device.

10. A shift register comprising: a gaseous discharge device including a plurality of iterative arrays of energizing electrodes with each energizing electrode positioned in priming relation to adjacent energizing electrodes, means forming a reference electrode position in discharge sustaining relation to the energizing electrodes, and an ionizable medium between said means forming a reference electrode and said energizing electrodes; alternating potential energizing means connected to said arrays of energizing electrodes; quenching means comprising a direct current source having alternate potential levels connected to said means forming a reference electrode, and a circuit connected to conjointly control said alternating potential energizing means and said direct current source for sequentially energizing the arrays of energizing electrodes and for changing the direct current potential level on said means forming a reference electrode intermediate of the removal of energization from one array of energizing electrodes and the application of energization to a next array of energizing electrodes to thereby increase the maximum shifting speed of said register.

11. In an information handling system including a gaseous discharge device having a gas-filled channel, means forming a plurality of discrete glow discharge positions in said channel, and means for shifting glow discharges from one discrete glow discharge position to another, an input means comprising: means forming a pair of input electrodes; an alternating potential generator of relatively low-energy normal output coupled to said means forming input electrodes for normally maintaining a glow discharge of restricted volume in said channel; and means for setting said generator to a relatively high-energy output for expanding said glow discharge to thereby prime a predetermined one of said discrete glow discharge positions.

12. An information handling system comprising: a gaseous discharge device including a pair of gas-filled channels, respective energizing electrode systems connected in parallel each including a plurality of iterative arrays of electrodes juxtapositioned along each channel with each electrode of each system positioned in priming relation to adjacent electrodes of the system, and means forming a reference electrode positioned in discharge sustaining relation to said energizing electrode systems; respective alternating potential generators directly connected to each of said first, second, and third arrays of energizing electrodes; a selectively operable input circuit for entering a primary pattern of gaseous discharges into one of said pair of channels and for simultaneously entering a complementary pattern of gaseous discharges into the other channel; a circuit for sequentially actuating said generators to simultaneously shift both of said primary pattern and said complementary pattern; and quenching means constituting a part of each alternating potential generator for developing a rapidly changing direct quenching potential and for applying said direct quenching potential to the connected array of energizing electrodes upon deactuation of the generator for increasing the maximum speed of shifting of said patterns.

13. An information handling system according to claim 12, wherein said pair of channels are formed of a single envelope.

14. In an information handling system for simultaneously registering and shifting a binary word and the complement of said word including first and second gaseous discharge channels having respective arrays of energizing and reference electrodes connected in parallel, and respective transfer electrodes juxtaposd to each channel and positioned in priming relation to a predetermined energizing electrode of the respective channel, an input means comprising: means for priming said transfer electrodes; respective energizing potential generators connected to said transfer electrodes; selectively operable means for temporarily actuating one of said generators for temporarily energizing the connected transfer electrode to thereby prime the corresponding predetermind energizing electrode; quenching potential generating means; and means for applying said quenching potential to the region of influence of the temporarily energized transfer electrode.

15. A combined high frequency energizing and D.C. quenching potential generator comprising: an oscillatory circuit including an electron discharge device having at least a cathode, an anode, and a control grid; a connection from said cathode to a reference potential source; an output terminal connected to said anode; an inductor connected between said anode and a junction point; a dropping resistor connecting said junction point to a source of relatively high direct potential whereby the direct potential at said output terminal is at a relatively low value when said electron discharge device is conducting and at a relatively high value when said device is nonconducting; means connected to said control element for selectably rendering said device conducting or nonconducting; a capacitor having one end connected to said junction point; a diode connected between the other end of said capacitor and said reference potential for enabling said capacitor to limit the rate of fall of said relatively high value of potential when said device is rendered conducting.

16. An information handling system comprising: a gaseous discharge device including a pair of gas-filled channels, respective energizing electrode systems each including a plurality of iterative arrays of electrodes juxtapositioned along each channel with each electrode of each system positioned in priming relation to adjacent electrodes of the system, and means forming a reference electrode positioned in discharge sustaining relation to said energizing electrode systems; a selectively operable input circuit for entering a pattern of gaseous discharges into one of said channels and for simultaneously entering a complementary pattern of gaseous discharges into the other channel; an energizing circuit for sequentially applying energizing potentials to said iterative arrays of energizing electrodes for simultaneously shifting said pattern and said complementary pattern; quenching potential generating means; and means for applying the quenching potential to the regions of influence of said energizing electrodes for increasing the maximum speed of shifting of said patterns.

17. An information handling system according to claim 16, wherein said means for applying the quenching potential includes a circuit for applying said quenching potentials in timed relation to the application of said energizing potentials.

18. An information handling system according to claim 16, wherein said pair of channels are formed of a single envelope.

19. An information handling system including: a gaseous discharge device having first, second, and third iterative arrays of energizing electrodes with each energizing electrode in priming relation to adjacent energizing electrodes, a reference electrode in discharge sustaining relation to said energizing electrodes, and an ionizable gas between said energizing electrodes and said reference electrode; information input means for establishing a pattern of glow discharges in said gas corresponding to the information to be handled; a source of shifting pulses; a circuit connected to said arrays and controlled by said pulses for sequentially applying energizing potentials to said arrays of electrodes for shifting said pattern of glow discharges; and a quenching potential generator connected to said reference electrode for applying a quenching potential to said gas to thereby increase the maximum speed of shifting of said pattern.

20. An information handling system according to claim 19, wherein said quenching potential generator comprises an alternating potential oscillator.

21. An information handling system according to claim 19, wherein said quenching potential generator comprises a direct potential amplifier controlled in timed relation to the application of said energizing potentials.

22. An information handling system according to claim 19, wherein said quenching potential generator comprises a pulse amplifier controlled in timed relation to the application of said energizing potentials.

23. An information handling system according to claim 19, wherein said quenching potential generator comprises a damped wave generator controlled in timed relation to the application of said energizing potentials.

24. An information handling system comprising: a gaseous discharge device including first, second, and third iterative arrays of energizing electrodes with each energizing electrode positioned in priming relation to adjacent energizing electrodes, first, second, and third iterative arrays of reference electrodes positioned in discharge sustaining relation to respectively corresponding first, second, and third arrays of energizing electrodes to form a plurality of discrete gaseous discharge positions, and an ionizable medium between said energizing and reference electrodes; means for establishing a gaseous discharge at a selected one of said discrete gaseous discharge positions; a circuit for shifting said gaseous discharge to successive gaseous discharge position comprising means for sequentially energizing and de-energizing said arrays of energizing electrodes; quenching potential generating means; and means for applying said quenching potential to each array of reference electrodes immediately following a de-energization of a respectively corresponding array of energizing electrodes for increasing the maximum speed of shifting of said gaseous discharge.

25. An information handling system comprising: a gaseous discharge device including first, second, and third iterative arrays of energizing electrodes with each energizing electrode positioned in priming relation to adjacent energizing electrodes, first, second, and third arrays of reference electrodes positioned in discharge sustaining relation to respectively corresponding first, second, and third arrays of energizing electrodes to form a plurality of discrete gaseous discharge positions, and an ionizable medium between said energizing electrodes and said reference electrodes; means for establishing a gaseous discharge at at least one of said discrete gaseous discharge positions; and means for rapidly shifting said gaseous discharge to successive gaseous discharge positions comprising a separate energizing potential generator connected to each of said arrays of energizing electrodes, a separate quenching potential generator connected to each of said arrays of reference electrodes, and a control circuit having first outputs connected to said energizing electrodes and second outputs complementary to said first outputs connected to said quenching potential generators for inversely controlling corresponding energizing potential generators and quenching potential generators.

26. An information handling system according to claim 25, wherein said quenching potential generators comprise alternating potential oscillators.

27. An information handling system according to claim 25, wherein said quenching potential generators comprise means for applying changing levels of direct potential to said reference electrodes.

28. An information handling system according to claim 25, wherein said quenching potential generators comprise pulse generators.

29. An information handling system according to claim 25, wherein said quenching potential generators comprise damped wave generators.

30. An information handling system comprising: a gaseous discharge device including a first array of energizing electrodes, a second array and a third array of energizing electrodes sequentially alternately positioned between the electrodes of said first array of energizing electrodes with each energizing electrode positioned in priming relation to adjacent energizing electrodes, a first array of reference electrodes positioned opposite and in overlapping and in discharge sustaining relation to adjacent electrodes of said first and third arrays of energizing electrodes, a second array and a third array of reference electrodes sequentially alternately positioned between the electrodes of said first array of reference electrodes, and an ionizable medium between the energizing and reference electrodes; selectively operable means for priming a given electrode of said first array of energizing electrodes; normally operative energizing means connected to said first array of energizing electrodes for establishing a gaseous discharge at said given electrode when said given electrode is primed; normally operative quenching means for applying a quenching potential to said third array of reference electrodes; a cyclically operable circuit for periodically (1) de-energizing said first array of energizing electrodes and removing said quenching potential from said third array of reference electrodes, (2) sequentially energizing said second and third arrays of energizing electrodes and sequentially applying a quenching potential to said first and second arrays of reference electrodes, and (3) re-energizing said first array of energizing electrodes and re-applying said quenching potential to said third array of reference electrodes to shift said gaseous discharge from one electrode of said first array of energizing electrodes to another; and output means for detecting the presence of a gaseous discharge at a selected energizing electrode.

31. An information handling system according to claim 30, wherein said output means comprises a pair of internal electrodes positioned in the area of influence of said selected electrode and symmetrically located with respect to said selected electrode.

32. An information handling system according to claim 30, wherein said output means comprises a pair of internal electrodes positioned in the area of influence of said selected electrode and asymmetrically located with respect to said selected electrode.

33. An information handling system comprising: a gaseous discharge device including a plurality of iterative arrays of energizing electrodes with each energizing electrode positioned in priming relation to adjacent energizing electrodes, a plurality of iterative arrays of reference electrodes with each reference electrode positioned opposite and in discharge sustaining relation to adjacent pairs of said energizing electrodes, and an ionizable medium between said energizing and reference electrodes; and a circuit for establishing and rapidly shifting a pattern of gaseous discharges in said medium comprising means for sequentially applying energizing potentials to said arrays of energizing electrodes and means for sequentially applying quenching potentials to said arrays of reference electrodes in a predetermined time relation to the application of said energizing potentials to the energizing electrodes.

34. An information handling system comprising: a gaseous discharge shifting device including means forming a plurality of discrete gaseous discharge positions; means for initiating a gaseous discharge at at least one of said discrete gaseous discharge positions; means for shifting gaseous discharges from one discrete gaseous discharge position to another; a source of quenching potential; and means connected to said source for applying said quenching potential to said discrete gaseous discharge positions to thereby increase the maximum speed of shifting of said gaseous discharges.

35. An information handling system comprising: a gaseous discharge device including a gas-filled envelope and means for establishing and shifting a pattern of gaseous discharges in said envelope; a quenching potential generator comprising an alternating potential generator having an output circuit; an external electrode juxtapositioned along said envelope; and a connection from said output circuit to said electrode for applying said alternating quenching potential to the gas in said envelope for accelerating the decay of gaseous discharges to thereby increase the maximum speed of shifting of said pattern.

36. An information handling system comprising: a gaseous discharge device including a vessel filled with ionizable gas, means for initiating glow discharges at predetermined positions in said vessel, and means for shifting said glow discharges from one of said predetermined positions to another; means for developing a quenching potential; and means for applying said quenching potential to said predetermined positions to thereby increase the maximum speed of shifting of said glow discharges.

37. An information handling system comprising: a gaseous discharge device including a gas-filled channel, and a plurality of iterative arrays of electrodes juxtapositioned along said channel and forming a plurality of gaseous discharge positions with each discharge position in priming relation to adjacent discharge positions; means for entering a gaseous discharge into a selected gaseous discharge position; cyclically operable means for energizing said electrodes for shifting said gaseous discharge from one gaseous discharge position to another; quenching potential generating means; and means for applying the quenching potential to each gaseous discharge position during at least one portion of each shifting cycle to thereby increase the maximum speed of shifting of said gaseous discharge.

38. An information handling system according to claim 37, wherein said quenching potential generating means comprises an alternating potential generator.

39. An information handling system according to claim 37, wherein said quenching potential generating means comprises means for developing rapidly changing levels of direct potential.

40. An information handling system according to claim 37, wherein said quenching potential generating means comprises a pulse generator.

41. An information handling system according to claim 37, wherein said quenching potential generating means comprises a damped wave generator.

42. In combination with a gaseous discharge device having means forming a plurality of discrete gaseous discharge positions; means for initiating a gaseous discharge at at least one of said discrete gaseous discharge positions; means for selectively applying energizing potentials to said discrete gaseous discharge positions for shifting gaseous discharges from one gaseous discharge position to another; quenching potential generating means; and means for applying the quenching potential to said discrete gaseous discharge positions in timed relation to the application of said sustaining potentials to increase the maximum speed of shifting of said gaseous discharges.

43. In combination with a gaseous discharge device having means forming a plurality of discrete gaseous discharge positions; means for initiating gaseous discharges at a selected plurality of said gaseous discharge positions to form a pattern of gaseous discharges; means for shifting said pattern of gaseous discharges; quenching potential generating means; and means for applying the quenching potential to said gaseous discharge positions to increase the maximum speed of shifting of said pattern.

44. A gaseous discharge device according to claim 43, wherein said quenching potential generating means comprises an alternating potential generator.

45. A gaseous discharge device according to claim 43, wherein said quenching potential generating means comprises a circuit for developing changing levels of direct potential.

46. A gaseous discharge device according to claim 43, wherein said quenching potential generating means comprises a pulse generator.

47. A gaseous discharge device according to claim 43, wherein said quenching potential generating means comprises a damped wave generator.

48. The combination of at least a pair of spaced electrodes having an ionizable medium therebetween to form a discrete ionizable cell, means for initiating ionization at said cell, an alternating energizing potential generator, means for applying the alternating energizing potential to said electrodes for sustaining initiated ionization at said cell, means for removing the alternating energizing potential from said electrodes to allow the ionization to decay, a quenching potential generator, and means for applying the quenching potential to the ionizable medium between said electrodes to accelerate the decay of the ionization.

References Cited in the file of this patent

UNITED STATES PATENTS

| | | |
|---|---|---|
| 2,457,125 | Chatterjea | Dec. 28, 1948 |
| 2,537,383 | Van Dorsten | Jan. 9, 1951 |
| 2,651,004 | Acton | Sept. 1, 1953 |
| 2,679,978 | Kandiah | June 1, 1954 |
| 2,684,440 | Wallace | July 20, 1954 |
| 2,739,266 | Burnett | Mar. 20, 1956 |
| 2,740,921 | Hough | Apr. 3, 1956 |